(12) United States Patent
Bisset

(10) Patent No.: US 6,774,596 B1
(45) Date of Patent: Aug. 10, 2004

(54) INDICATOR FOR A ROBOTIC MACHINE

(75) Inventor: David Lindsey Bisset, Wiltshire (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 09/959,874

(22) PCT Filed: May 22, 2000

(86) PCT No.: PCT/GB00/01971
§ 371 (c)(1),
(2), (4) Date: Nov. 9, 2001

(87) PCT Pub. No.: WO00/73867
PCT Pub. Date: Dec. 7, 2000

(30) Foreign Application Priority Data

May 28, 1999 (GB) .............................................. 9912472

(51) Int. Cl.⁷ .................................................. B25J 9/18
(52) U.S. Cl. ............................. 318/568.11; 318/568.12; 318/568.2; 318/565
(58) Field of Search ....................... 318/568.11, 568.12, 318/658.2, 565, 568.1; 700/245, 248

(56) References Cited

U.S. PATENT DOCUMENTS

| | | | | |
|---|---|---|---|---|
| 6,042,256 A | * | 3/2000 | Gothard | 362/558 |
| 6,157,143 A | * | 12/2000 | Bigio et al. | 315/307 |
| 6,296,367 B1 | * | 10/2001 | Parsons et al. | 362/183 |
| 6,442,450 B1 | * | 8/2002 | Inoue et al. | 700/245 |
| 6,488,390 B1 | * | 12/2002 | Lebens et al. | 362/231 |

* cited by examiner

Primary Examiner—Karen Masih
(74) Attorney, Agent, or Firm—Morrison & Foerster LLP (57) ABSTRACT

A robotic machine such as a robotic vacuum cleaner is controlled to carry out a task of cleaning a room. The machine has a plurality of sensors including infrared sensors, ultrasonic sensors and light sensors through which the machine can navigate its way around a room without hitting objects or walls in its path. The machine has an indicator light which changes color depending upon the state of interaction of the various sensors with the environment, indicating the 'mood' of the cleaner. The indicator may include three primary color light sources which are combined within a reflective frusto-conical chamber and a translucent lens dome in order to combine the primary colors into a single colored light as viewed by a user. This makes the machine more user-friendly.

28 Claims, 5 Drawing Sheets

INDICATOR FOR A ROBOTIC MACHINE

FIELD OF THE INVENTION

This invention relates to a robotic machine and to a method of operating a robotic machine. It can be applied to a robotic floor clearing device, such as a robotic vacuum cleaner, or some other robotic machine.

BACKGROUND OF THE INVENTION

It is known to provide a robotic vacuum cleaner programmed to clean the floor of a room. The programming may consist of feeding a detailed map of the room and training the cleaner to reciprocate to and fro from one side to the other side of the room. Alternatively, it may comprise leading the cleaner around the room in a training cycle so that the cleaner repeats the cycle from information stored in memory. International Patent Application No. PCT/GB99/04072 describes an autonomous vacuum cleaner which performs a spira-like pattern to traverse the floor surface of a room.

Some machines have warning lights to alert the user when a fault has occurred. For example, a vehicle engine management system will have a warning light which illuminates when a fault occurs. This way be a minor fault which does not have to be rectified urgently, or it may be a major fault requiring urgent attention. Until the vehicle fault is diagnosed by specialist equipment, or unless the vehicle breaks down, the user will be unaware of the state of health of his vehicle engine and its associated systems.

Domestic appliances such as washing machines and dishwashers have animated dials which indicate what part of the washing cycle the machine has reached. It is also known to use a limited range of indicator lamps to represent a large number of fault conditions, with each fault condition being represented by a different combination of illuminated lights or a combination of flashing and steady illumination of the lamps. This can be very confusing for a user, and often requires a user to consult a user manual to interpret the state of the machine.

Computers have programs which, by making an unusual sound, wan the user that he is adopting an illegal or inappropriate entry on the keyboard or that the computer cannot execute the requested function. A wide choice of such sounds is commonly available.

The Sony Corporation, on 11 May 1999, announced the launch of a four-legged entrainment robot called "AIBO". The head of the robot has two eyes, each eye having a red LED lamp and a green LED lamp spaced apart from one another. The red lamp is illuminated to express anger and the green lamp is illuminated to express happiness. The eyes flash red and men when the robot is confused.

Some users feel uneasy about using modern appliances. This is not helped by providing appliances that have a complicated and confusing away of controls and indicator.

SUMMARY OF THE INVENTION

It is an object of the present invention to improve a user's understanding of the state of interaction occurring between a machine and its environment.

A first aspect of the present invention provides a robotic machine having a plurality of sensors by means of which the robotic machine can interact with its environment, a controller for controlling the machine to carry out a task using the sensors, and an indicator light to indicate the state of interaction between the machine and the environment, wherein the controller is arranged to change the colour of the light according to the state of interaction and wherein the indicator light comprises two or more differently coloured light sources which am separately energisable, and means for combining the light output of the light sources to give the effect of a single coloured light.

The light sources can be illuminated alone or in combination.

By providing a single indicator which can take a range of colours, operation of the machine is made mom userfriendly. Rather than looking at a confusing away of indicators, the user simply looks at the colour of the single indicator for an indication of the machine's state or 'mood'. When only one of the light sources is energised the indicator appears as that colour. For example, when the red source is energised, the indicator appears red. When multiple light sources are energised at the same time, the outputs of the sources are combined and the indicator has the color of the combination For example, when the red and green sources are illuminated, the indicator appears yellow/orange. Small variations in the state of the machine can be easily conveyed by shifting the colour of the indicator, e.g. from green to green-blue.

Preferably the light sources comprise red, green and blue primary colour light sources as this combination of light sources is capable of generating the full range of visible colours.

There can be multiple light sources of each colour. This increases the light output and, by interleaving the sources with other, differently-coloured sources, an improved blending effect is achieved.

Each of the light sources can be provided as a separate device, a plurality of such devices being mounted on a support, or a single multi-source device can be provided. The multi-source device can include some form of diffused lens or this can be provided separately.

While the embodiment describes the use of the indicator light on a robotic vacuum cleaner, the indicator can be used on other forms of robotic machine.

Another aspect of the present invention provides a method of operating a robotic machine.

BRIEF DESCRIPTION OF THE DRAWINGS

Embodiments of the invention will now be described with reference to the accompanying drawings in which.

DETAILED DESCRIPTION OF THE INVENTION

Figure 1:
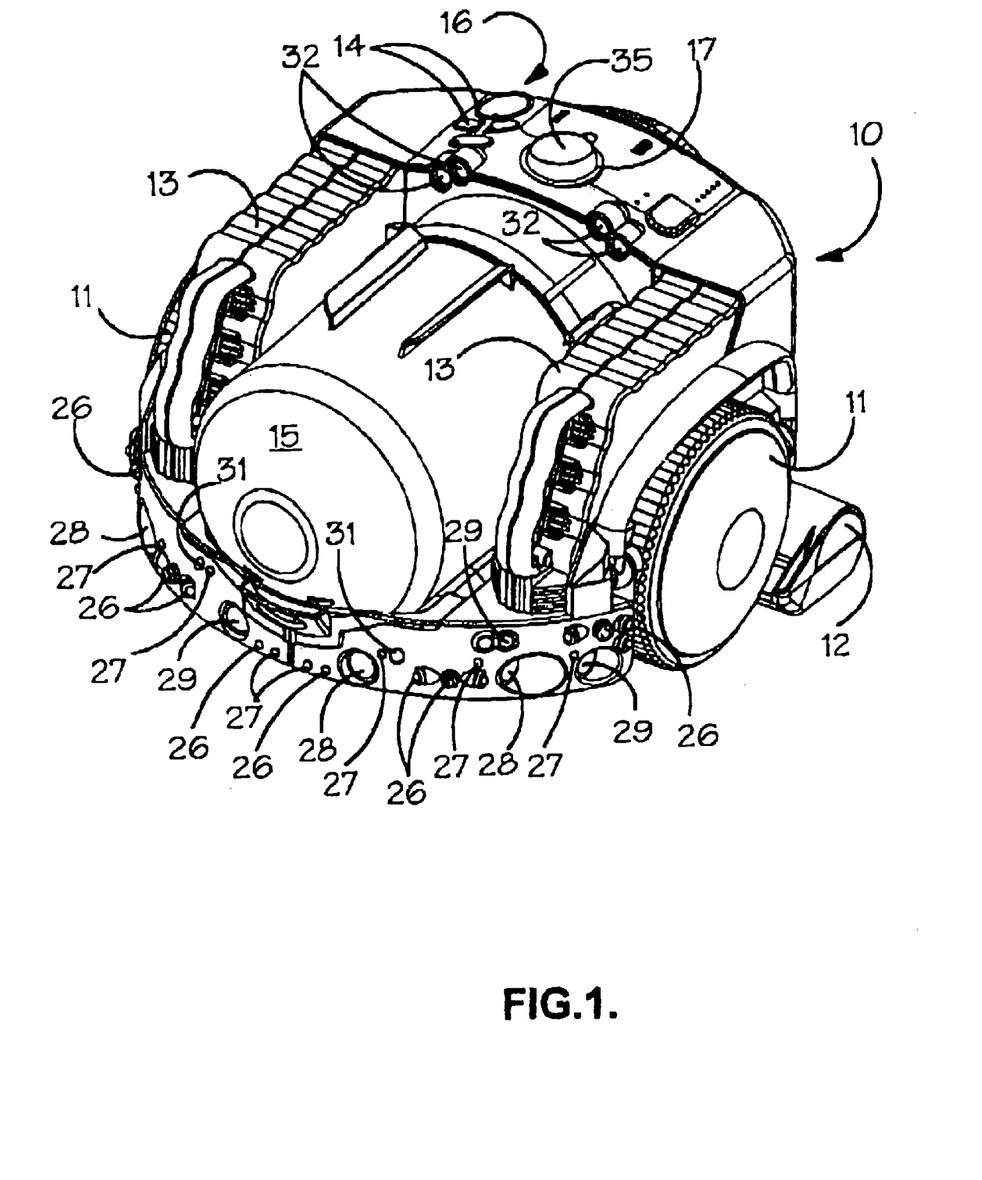
FIG. 1 is a perspective view of a robotic cleaning device according to an embodiment of the invention.

Referring to FIG. 1 of the drawings, ther is shown a robotic floor cleaning device in the form of a vacuum cleaner, comprising a main body 10, two drive wheels 11, a brush bar housing 12, two rechargeable battery packs 13, a cyclonic separator 15, light detectors 17, various sensors 26 to 32 and a user interface 16 which includes switches 14. The cyclonic separator is described more fully in EP-A-0 042 723. Other forms of separator such as a bag can be used in place of the cyclonic separator 15.

Mounted on the upper face of the cleaner 10 is an indicator light 35 which shows by its colour the state of interaction between the machine's sensors and its environment and thus indicates the "mood" of the machine. Conveniently, the indicator light 35 is mounted concentrically within the light detectors 17. The light detector 17 detects light received from a plurality of compass points around the vacuum cleaner, as described in our pending International Patent Application No PCT/GB 99/04092.

There are various ways in which the cleaner can be programmed. In a preferred method, the cleaner performs a spiral-like coverage of a room. The cleaner is programmed so that it firstly completes a traverse around the edge of a room, or around a feature or object in the room, and then moves inwards, or outwards, by approximately the width of the cleaner, and then completes a second traverse alongside the first. It then again moves in or out by a width for a third traverse alongside the second, and so on until the room has been cleaned. It thus follows a generally spiral-like path, except for obstacles such as furniture which lie in its path, and which it avoids by using its sensors to detect them and drive around them.

Figure 2:
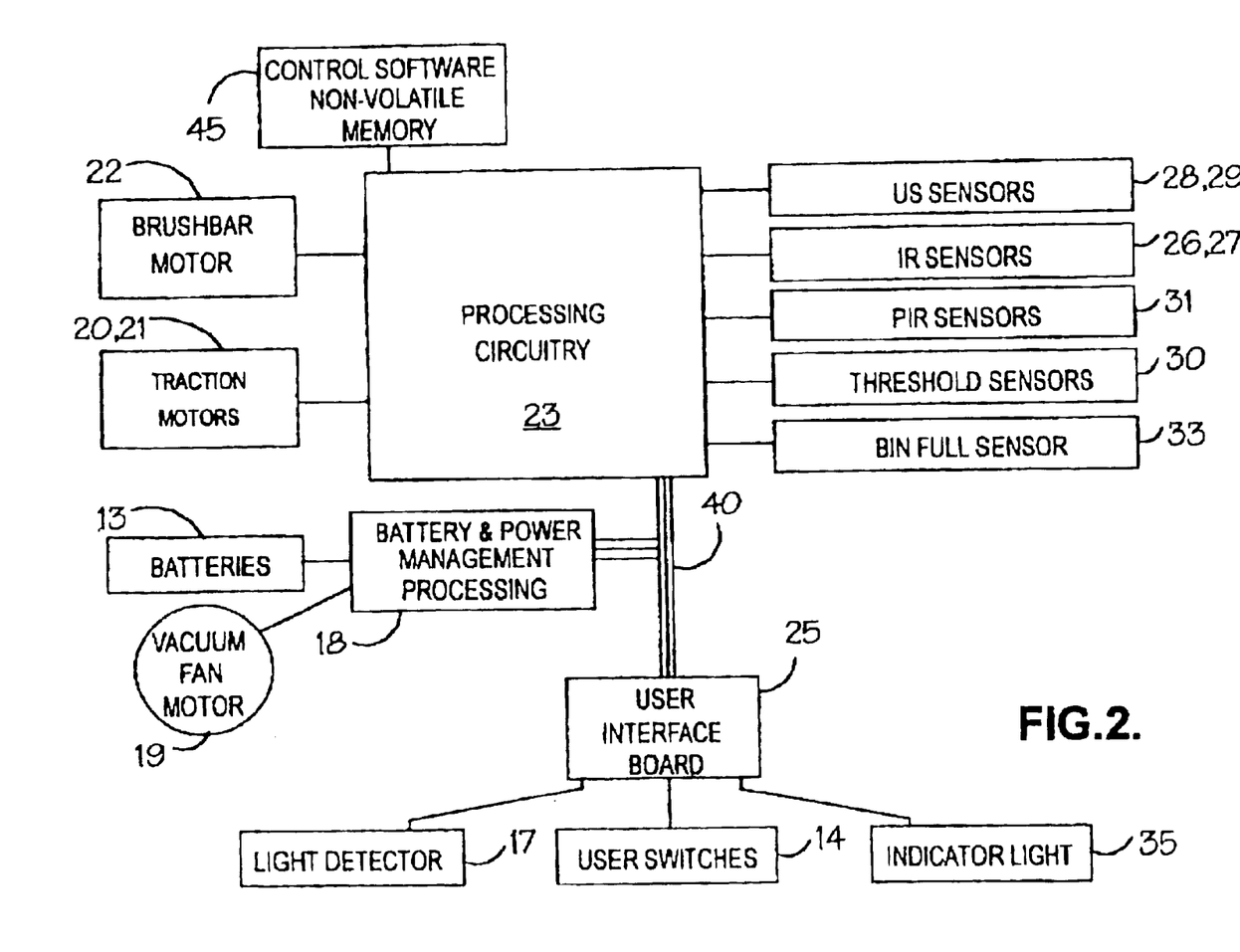
FIG. 2 is a schematic diagram of a power management and navigation system of the device of FIG. 1.

Referring now to FIG. 2 of the drawings, there are shown the rechargeable battery packs 13, a battery and motor management system 18, a motor 19 for driving a suction fan, motors 20 and 21 for driving the left and right hand wheels 11, a motor 22 for driving the brush bar, processing circuitry 23 of the navigation and control system, a user interface board 26 and the light detector 17. The processing circuitry 23 includes a microprocessor, a field programmable gate array (FPGA) and control software 45. The indicator light 35 is connected to the user interface board 25 and is controlled by signals received from the processing circuitry 23 over communications link 40.

The navigation system of the clear includes the various s 26 to 32 as shown in FIG. 2. Them are four main ultrasonic transmitter/receiver pairs 29 which face forwards, rearwards and to opposite sides of the robotic cleaner. The signals received from these receivers 29 not only provide information representative of distance from a feature of the room or from an object in the room, but the amplitude and width of the received signals vary according to the type of material sensed. Threshold sensors 30 detect the presence of a portable threshold locator (not shown) placed, for example, at the entrance to a room or at the top of a staircase, and one or more pyroelectric or passive infrared (PIR) detectors 31 are provided for detecting animals and fires. It will be appreciated that the type of sensor (ultrasonic, infrared) is not important to the invention and that other types of sensor can be used in addition to these, or instead of these.

The mood indicator light 35 is controlled by the processor circuitry 23 through the user interface board 26. The processor circuitry 23 determines from the sensors 26 to 32 and the motor current sensors, the interaction of the cleaner with its surroundings.

Figure 3A:
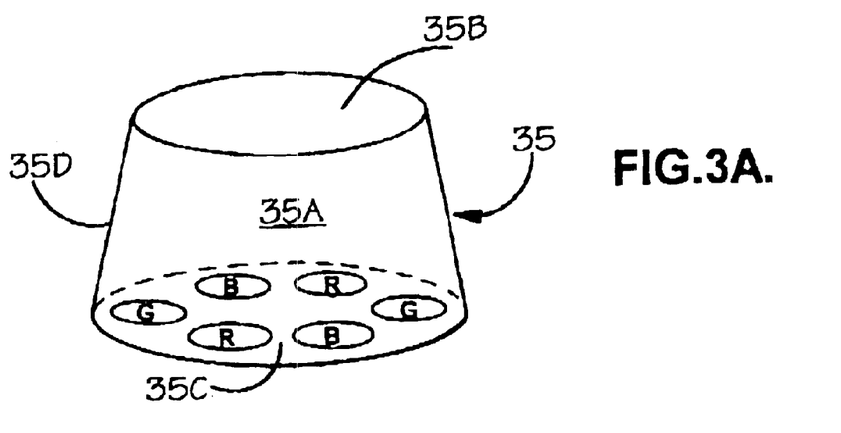
FIGS. 3A and 3B schematically show two few of indicator light used in the cleaning device of FIG. 1.

Referring now to FIG. 3A, in the preferred embodiment the mood indicator light 35 comprises six LED light sources grouped together under a dome 35A which can be formed of a translucent or transparent material, such as a plastics material. The LEDs emit light in primary colours—red (R). blue (B) and green (G). It is preferred that a pair of each LEDs are provided. Each colour pair is energized separately from the other pairs. The LEDs are housed beneath a frusto-conical chamber 35A having a base 35C supporting the LEDs, and a light diffuser 35B supported on top of a frusto-conical wall 35D. The light diffuser 35B can be achieved by treating the upper surface of the chamber 35A to render it translucent, or by a separate diffuse part. The light diffuser 35B operates in a way which combines the light output of the LEDs so that the user sees the combined effect of the LEDs rather than their individual outputs. The inside wall of the frusto-conical wall 35D is reflective, which can be achieved by silvering the tapering wall 35D.

Figure 3B:
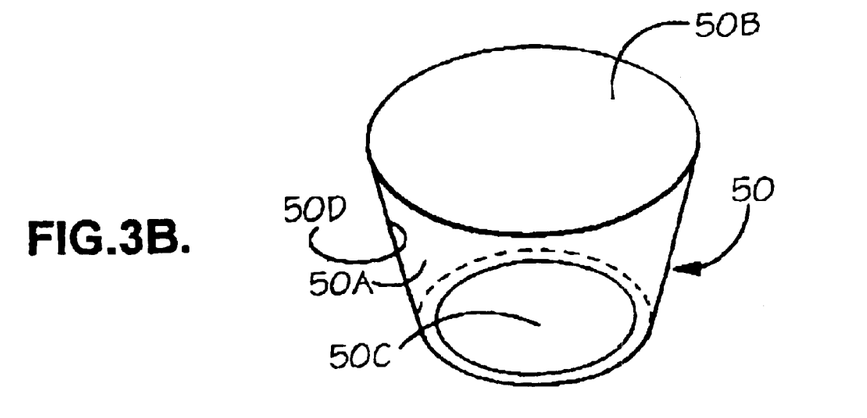

In the alternative arrangement of FIG. 3B, mood indicator light 50 comprises a single device 50C which includes multiple light sources (red, green and blue.) A diffused lens may be provided as part of the device 50C for combining the outputs of the individual light sources. As such devices 50C arm usually quite compact, it is preferred to mount the device mounted beneath an outwardly tapering chamber 50A which includes a light diffuser 50B on its upper face.

Figure 4:
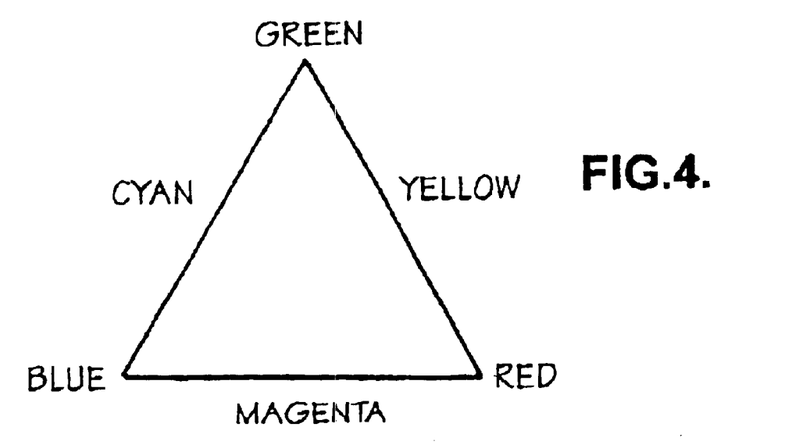
FIG. 4 shows Fe well-known colour triangle.

Referring to the colour triangle in FIG. 4, the mood indicator light has the capability of producing any visible colour by energizing the R, G and B LED light sources by the correct amount, according to the colour triangle.

It would be possible to have a simpler mood indicator light with, for example, just two light sources. A more limited range of colours would be obtainable in the combined output. Also the light sources need not be primary colours but then the range of colours obtainable from the combined output would be further restricted.

Figure 5:
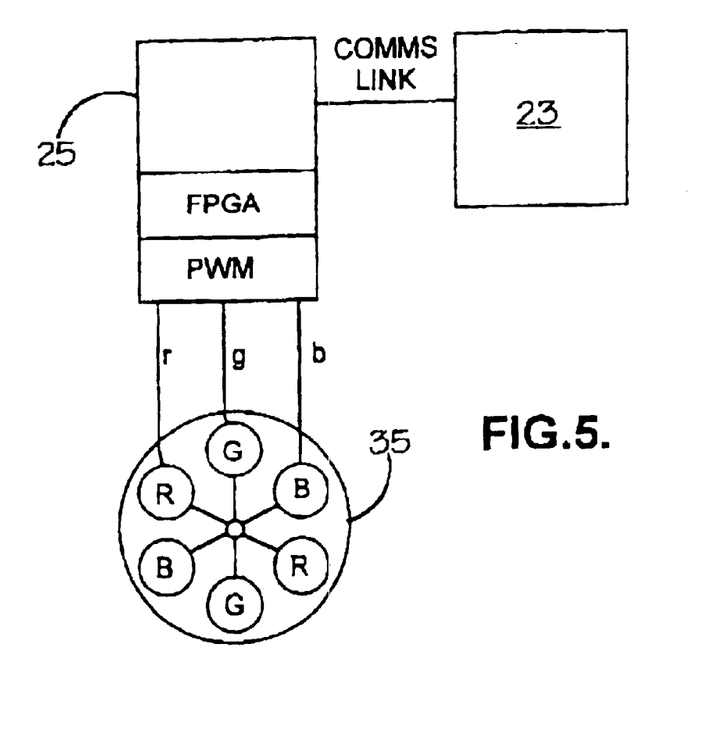
FIG. 5 shows the functional blocks which control the indicator light.

Referring to FIG. 5 of the drawings, the processor circuitry 23 detects the sensor activity from sensors 27 to 32 and controls the vacuum cleaner and guides it around the room. Also the communications link between circuitry 23 and the user interface 25 provides information on the amount of sensor activity. The energy provided to the red, green ad blue light emitting diodes R,G,B of the mood light 35 are controlled by pulse width modulation PWM to achieve the colour corresponding to the amalgamated sensor activity as determined by processing circuitry 23.

Figure 6:
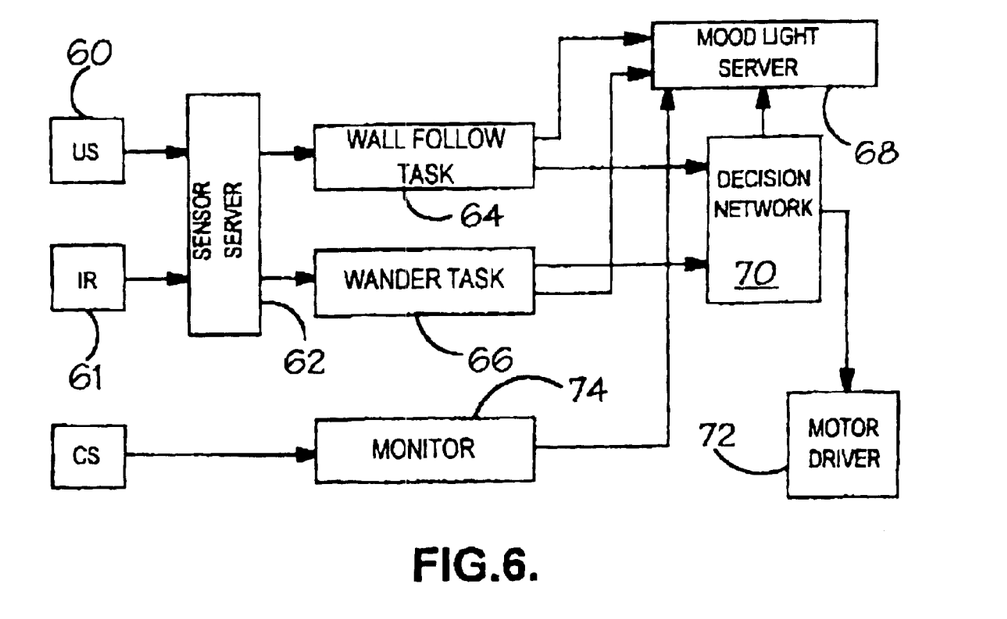
FIG. 6 schematically shows the software tasks performed by the controller of the cleaning device.

In this embodiment the activity of the vacuum cleaner is broken down in the software into individual tasks, based on what is known as a Subsumption Architecture. FIG. 6 shows this schematically.

There are several independent tasks or activities of the cleaner in the software, two examples appropriate to this embodiment being Wander and Wall Follow. The various sensors 26 to 32 provide sensor values via a server mechanism to the software and each software task interrogates the server to establish the sensor values.

At the lowest level the sensor software drivers handle low level interaction with the hardware to obtain the information provided by the sensors 26 to 32. There is a single driver which can communicate with all the hardware sensors of a single type and two examples are shown in FIG. 6, namely all the ultrasonic sensors arm handled by driver US and all the infrared sensors are handed by driver IR.

The Sensor Server 62 handles requests from the Tasks and obtains data from the drivers and presents it back in a more appropriate form. Each Task makes a decision as to what it believes is the appropriate behaviour.

The Mood Light Server receives the R, G. B suggestions from the Tasks and a single representative R. G. B value is calculated and used as the indication on the mood light 35.

The Mood Light Server has knowledge about the relative importance of the Task suggestions and can determine the appropriate R. G. B value based an this knowledge.

Looking first at the Wall Follow Task, in this embodiment the Task will expect, in order to establish Wall Follow behaviour, to find a wall on the left hand side of the cleaner, nothing in front and nothing to the right. If the Wall Follow Task sees this set of sensor conditions then it decides that it is competent to act in controlling the cleaner. As long as those sensor conditions prevail then it will continue to act, and appropriate motor drive commands are sent to the left and right hand drive motors 20 and 21 (FIG. 2) via the motor drive interface MD. At the same tune, the Wall Follow Task sends a signal to the Mood Light Server. The Mood Light Server sends signals to the mood indicator light 35 via the communications link and the user interface 26 to energize the mood light. Thus a data packet caries commands and data resting the appropriate power level for each light source R, G and B. The commands are interpreted by the FPGA in the user interface 25 to turn on the source (e.g. R=0, B=250, G=0) through the pulse width modulator PWM and the green source connection g (FIG. 3). It should be pointed out that FIG. 5 is very schematic: for example, each source would normally have its own pulse width modulator and the block PWM represents this, as would be understood by those skilled in the art.

The Task named Wander in this embodiment will expect, in order to establish Wander behaviour, to find no wall on either side or in the front. In this embodiment this means the cleaner cannot locate a reference point by means of which it can orientate itself. If the Wander Task finds this set of sensor conditions then it decides it is competent to act in controlling the cleaner and will continue to do so as long as these conditions prevail. Motor drive commands are sent to the left and right hand drive motors 20, 21 (FIG. 2) via the motor drive interface MD.

At the same time the Wander Task sends a "yellow" signal to the Mood light Server. The Mood Light Server signals to the mood light 35 via the communications link to energize the LEDs, based on its determination of all inputs, to provide a yellow light ie substantially equal power to source R and source G and no power to source B, ie. R=50, G=50 and B=0.

Similarly, other software tasks which control the motion of the vacuum cleaner are able to provide R, G and B values to the Mood Light Server thus influencing the state of the mood indicator light.

Each software task is continually signalling so long as it decides it is competent and the decision network passes the preferred signal, or the only signal, on to the motor driver interface MD.

In addition to the software tasks, there is a monitor system Monitor which also reads the sensor signals. The monitor system will check that when drive current is applied to one or both drive motors (as sensed by the current sensors) an appropriate change of signal occurs at the distance sensors. For example, if the drive motors are attempting to drive the cleaner forward then it will expect to see the distance from a wall in front of the cleaner decrease using say the infrared sensors for near distance, or the ultrasonic sensors for far distance.

Then again, if the drive motors are trying to rotate the cleaner, it will expect to see a change in the side wall sensors as the side wall should disappear from range.

The Monitor Task will send a sign to the Mood Light Server if its check indicates the distance sensor signals are not changing despite the drive motors being energized, i.e. the cleaner is stuck. It will also power down the cleaner after a predetermined period if the cleaner does not move or if some other malfunction is detected, and it will signal a visible pulsed mode to the red light source R.

Figure 7A:
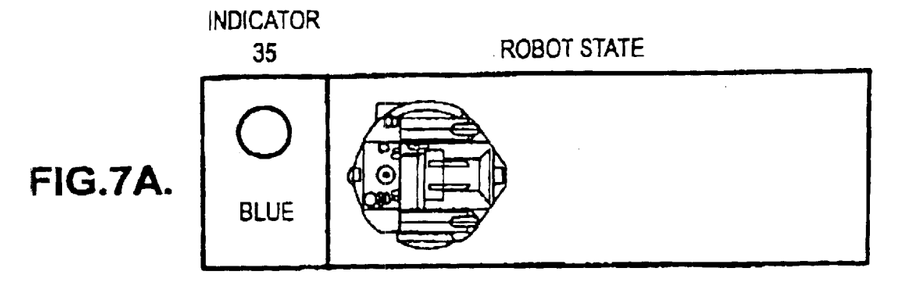
FIGS. 7A–7D show a range of states for the cleaner and the corresponding condition of the indicator light.
Figure 7B:
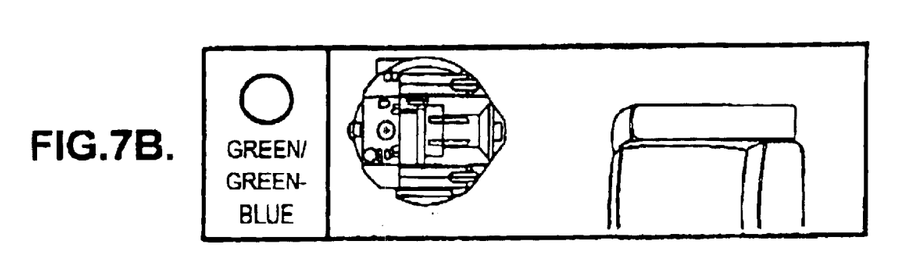
Figure 7C:
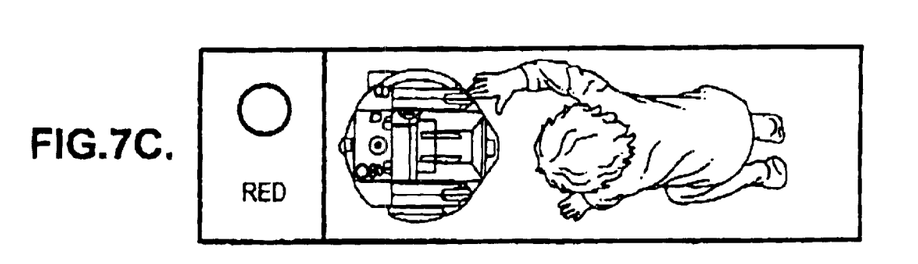
Figure 7D:
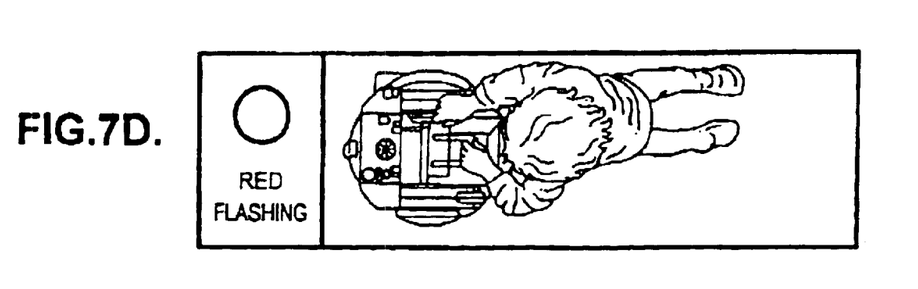

In this embodiment the mood light can have:

1) a blue colour when the cleaner is "happy" and, for example, travelling along a wall in a straight line which requires minimal sensor activity (FIG. 7A);
2) a green-blue colour which will be produced when turning a corner or navigating around an obstacle, resenting a more demanding scenario and hence inched sensor activity including changes in drive current to the noon (FIG. 7B);
3) a yellow-green (i.e. more yellow than green) colour if the heat sensors sense a warm object ahead in the path of the cleaner;
4) a red colour if the heat sensor senses a hot body ahead, for example a fire, or if there is very significant sensor activity when the cleaner is sensing several objects and there are rapid changes in drive motor currents which may be regarded as a very demanding scenario (FIG. 7C);
5) a flashing red light if the sensor activity is very high such as "abuse", or jammed driving wheels or brush bar or the cleaner is stuck in one place and unable to extricate itself (FIG. 7D).

It is to be understood that these examples of colour and colour changes can be modified within the scope of the present invention and the particular colours chosen to indicate particular scenarios and interaction with the environment are examples only and not specifically limiting.

In the extreme case when for example a brush bar becomes jammed or a drive wheel becomes jammed, then the associated drive motor will draw a larger current during attempts to drive the brush bar or the drive wheel. The current sensors detecting these higher motor currents and rapid changing rents are shown in FIG. 6 schematically.

When the cleaner is searching for a wall using its IR sensors and also during a self-test mode, the green LEDs will be energized.

When the cleaner is turning a corner using its ultrasonic sensors, both blue and green LEDs will be energized to create an overall green-blue colour.

Mood indicator light 35 only operates in auto-run mode i.e. during automatic operation. The cleaner can be used in other modes not further described here but for example when using a hose to clean corner or perimeters which the cleaner on automatic run would not be able to teach. The mood indicator light 35 does not operate in these modes.

As described the colour of the mood indicator light 35 indicates to the user the state of the interaction between the robot and its environment. If the machine becomes blocked in so that it cannot move, or if it has come to a stair edge and finds that it cannot safely back away from the edge, then the mood light will after some seconds flash red on and off. This represents one extreme "mood" in which the machine is very "unhappy". After a short period of time, e.g. 10 minutes, in this mood the machine will shut down and meanwhile the flashing red light invites user intervention.

At the other extreme when the machine is running according to the program the mood light will show a continuous green colour. As the machine proceeds in cleaning the floor it will approach a wall or object to be navigated and the sensors will detect this The cleaner will turn to the right or to the left in order to continue cleaning and during this activity the increased sensor activity will change the mood light to a green-yellow colour to indicate the change in activity. When the turn is complete the mood light will revert to green colour as previously.

If the cleaner enters a blind alley say between a sofa and a wall with a second wall closing the end, having been following the first wall the cleaner mood light will show green initially. As the cleaner turns at the end of the alley firstly through 90° to the right as it detects the second wall the mood light will change to green-yellow and then through another 90° to the right as it detects the sofa the mood light will continue green-yellow but revert to blue-green as it travels back up the alley. If in the meantime the entrance to the alley has become blocked so the cleaner has no way out then within a few seconds the mood light will change from green to green-yellow as it attempts to manoeuvre with increased sensor activity, and finally it will turn red to indicate that it is not "happy". Within another few seconds if the block to the alley has not been removed the cleaner will shut down its cleaning action and the mood light will change from continuous red to flashing red.

The embodiment described depends upon a source of light by which to navigate using the light sensors 17. If for example the light is suddenly extinguished, the cleaner will become highly confused and will go into its red light mode followed by red flashing light mode. This might happen if for example a cushion fell on top of the cleaner or a child abused the cleaner by sitting upon it.

If the cleaner has shut down prematurely before completing the cleaning of the room, when the cleaner is next attended by the user it will not have finished clearing and will not have returned to its staring position according to the program. Accordingly the machine can either be started and the path rendered navigable by the user, and the cleaner will continue and complete the area as yet not cleaned during the previous attempt. Alternatively, the cleaner can be repositioned at its original staring point, the path having been rendered navigable by the user, and the whole room cleaned again.

Referring back to the colour triangle in FIG. 4, the mood light will show green by energizing the green LED. It will show green-yellow by energizing green and, to a lesser extent, the red LED. Any colour can be can as it well known in the art by addition of the three prime colours of the LEDs as shown in the colour triangle.

What is claimed is:

1. A robotic machine comprising a plurality of sensors by which the robotic machine can interact with its environment, a controller for controlling the machine to carry out a task using the sensors, and an indicator light to indicate a state of interaction between the machine and the environment, wherein the controller is configured to change a color of the light according to the state of interaction and wherein the indicator light comprises two or more differently colored light sources which are separately energizable and a device for combining light output by the light sources to give an effect of a single colored light.

2. A machine according to claim 1, wherein the light sources are energizable at the same time.

3. A machine according to claim 2, wherein the light sources are red, green and blue.

4. A machine according to claim 1, 2 or 3, comprising a plurality of light sources of each color.

5. A machine according to claim 1, 2 or 3, wherein the power of each light source is separately controllable.

6. A machine according to claim 5, wherein the power of each light is controllable by a pulse width modulator in response to a control signal indicative of the required power.

7. A machine according to claim 1, 2 or 3, wherein the combining device comprises a light diffuser.

8. A machine according to claim 7, wherein the light diffuser is a translucent lens.

9. A machine according to claim 8, wherein the light sources are grouped beneath a tapering chamber.

10. A machine according to claim 9, wherein the chamber tapers inwardly from the light sources.

11. A machine according to claim 9, wherein the chamber has a reflective coating.

12. A machine according to claim 1, 2 or 3, wherein a software architecture is used to input the state of the machine to a processing mechanism which determines the energization of the light sources.

13. A machine according to claim 4, wherein the power of each light source is separately controllable.

14. A machine according to claim 4, wherein the power of each light is controllable by a pulse width modulator in response to a control signal indicative of the required power.

15. A machine according to claim 4, wherein the combining means comprises a light diffuser.

16. A machine according to claim 15, wherein the light diffuser is a translucent lens.

17. A machine according to claim 5, wherein the combining means comprises a light diffuser.

18. A machine according to claim 17, wherein the light diffuser is a translucent lens.

19. A machine according to claim 10, wherein the chamber has a reflective coating.

20. A machine according to claim 4, wherein a software architecture is used to input the state of the machine to a processing mechanism which determines the energization of the light sources.

21. A machine according to claim 5, wherein a software architecture is used to input the state of the machine to a processing mechanism which determines the energization of the light sources.

22. A machine according to claim 6, wherein a software architecture is used to input the state of the machine to a processing mechanism which determines the energization of the light sources.

23. A machine according to claim 9, wherein a software architecture is used to input the state of the machine to a processing mechanism which determines the energization of the light sources.

24. A machine according to claim 12, wherein a software architecture is used to input the state of the machine to a processing mechanism which determines the energization of the light sources.

25. A method of operating a robotic machine, comprising:
providing a controller, a plurality of sensors by means of which the robotic machine can interact with its environment, and an indicator light comprising two or more differently colored light sources which are separately energizable and a device for combining the light output of the light sources to give an effect of a single colored light, using the controller to control the machine to carry out a task using the sensors, using the indicator to indicate a state of interaction between the machine and the environment, and changing the color of the indicator light according to the state of interaction between the machine and the environment.

26. A robotic floor cleaning device comprising a robotic machine comprising a plurality of sensors configured to interact with a floor to be cleaned, a controller for controlling the machine to carry out floor cleaning using the sensors, and an indicator light to indicate a state of interaction between the machine and the floor to be cleaned, wherein the controller is configured to change a color of the light according to the state of interaction and wherein the indicator light comprises two or more differently colored light sources which are separately energizable and a device for combining light output by the light sources to give an effect of a single colored light.

27. A robotic floor cleaning device according to claim 26, wherein the light sources are energizable at the same time.

28. A robotic floor cleaning device according to claim 27, wherein the light sources are red, green and blue.

* * * * *